United States Patent
Chew et al.

(10) Patent No.: US 9,816,285 B2
(45) Date of Patent: Nov. 14, 2017

(54) FLOOD CONTROL

(71) Applicant: JOHNSON & NICHOLSON (M) SDN BHD, Kuala Lumpur (MY)

(72) Inventors: Kien Ming Chew, Kuala Lumpur (MY); Joon Yip Chew, Kuala Lumpur (MY)

(73) Assignee: JOHNSON & NICHOLSON (M) SDN BHD, Kuala Lumpur (MY)

( * ) Notice: Subject to any disclaimer, the term of this patent is extended or adjusted under 35 U.S.C. 154(b) by 0 days.

(21) Appl. No.: 14/387,816

(22) PCT Filed: Feb. 22, 2013

(86) PCT No.: PCT/MY2013/000032
§ 371 (c)(1),
(2) Date: Sep. 24, 2014

(87) PCT Pub. No.: WO2013/125939
PCT Pub. Date: Aug. 29, 2013

(65) Prior Publication Data
US 2015/0089888 A1     Apr. 2, 2015

(30) Foreign Application Priority Data
Feb. 24, 2012   (MY) .................. PI 2012000852

(51) Int. Cl.
*E02B 7/08*    (2006.01)
*E04H 9/14*    (2006.01)
*E02B 3/10*    (2006.01)

(52) U.S. Cl.
CPC ............. *E04H 9/145* (2013.01); *E02B 3/106* (2013.01); *E02B 3/108* (2013.01)

(58) Field of Classification Search
CPC .......... E02B 3/108; E02B 3/106; E04H 9/145
USPC .... 52/202, 213, 208; 405/91, 114, 284, 107, 405/115
See application file for complete search history.

(56) References Cited

U.S. PATENT DOCUMENTS

| | | | |
|---|---|---|---|
| 4,555,201 A | | 11/1985 | Paoluccio |
| 4,692,060 A | * | 9/1987 | Jackson, III .................. 405/115 |
| 4,869,617 A | * | 9/1989 | Chiodo ............................ 404/6 |
| 4,921,373 A | * | 5/1990 | Coffey .......................... 405/115 |
| 5,645,373 A | * | 7/1997 | Jenkins .......................... 405/91 |
| 5,993,113 A | * | 11/1999 | Darling ......................... 405/114 |
| 6,012,872 A | * | 1/2000 | Perry et al. .................. 405/114 |
| 6,042,301 A | * | 3/2000 | Sovran ......................... 405/112 |
| 6,164,870 A | * | 12/2000 | Baruh ........................... 405/114 |
| 6,443,655 B1 | * | 9/2002 | Bennett ........................ 405/114 |
| 6,450,733 B1 | * | 9/2002 | Krill et al. ................... 405/114 |
| 6,672,800 B2 | * | 1/2004 | Frank ............................ 405/115 |
| 6,840,711 B1 | * | 1/2005 | Martinez et al. ............. 405/107 |
| 6,871,464 B2 | * | 3/2005 | Hung ............................... 52/455 |
| 7,364,385 B1 | * | 4/2008 | Luke ............................ 405/114 |
| 7,546,710 B2 | * | 6/2009 | Abbott ........................... 52/202 |
| 7,690,865 B1 | * | 4/2010 | Stewart et al. ............... 405/115 |

(Continued)

OTHER PUBLICATIONS

International Search Report dated Jul. 18, 2013, in International Application No. PCT/MY2013/000032.

*Primary Examiner* — Basil Katcheves
*Assistant Examiner* — Joshua Ihezie
(74) *Attorney, Agent, or Firm* — Merchant & Gould P.C.

(57) ABSTRACT

The present invention provides a panel, a flood control assembly, a flood control device and a flood control barrier.

6 Claims, 5 Drawing Sheets

(56) References Cited

U.S. PATENT DOCUMENTS

| | | |
|---|---|---|
| 7,866,913 B2* | 1/2011 | Kulp et al. ............... 404/6 |
| 8,266,845 B2* | 9/2012 | Desjoyaux et al. ......... 52/167.7 |
| 2002/0110424 A1* | 8/2002 | Page ................... 405/115 |
| 2003/0082007 A1* | 5/2003 | Liou ................... 405/87 |
| 2004/0156680 A1* | 8/2004 | Gibbs .................. 405/15 |
| 2004/0194426 A1* | 10/2004 | Shapero ............... 52/749.1 |
| 2005/0169712 A1* | 8/2005 | Young ................. 405/116 |
| 2009/0064598 A1* | 3/2009 | Mouyiaris ............. 52/2.11 |
| 2010/0150667 A1* | 6/2010 | Phelps ................ 405/284 |
| 2010/0215436 A1* | 8/2010 | Johnson et al. ........ 405/110 |
| 2012/0315093 A1* | 12/2012 | Taylor ................ 405/114 |
| 2013/0071188 A1* | 3/2013 | Taylor ................ 405/114 |

\* cited by examiner

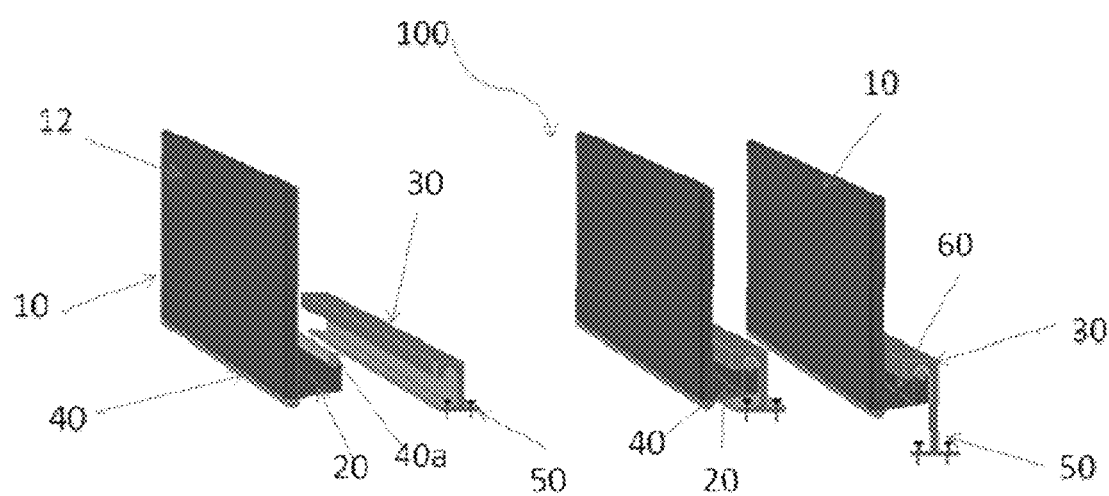
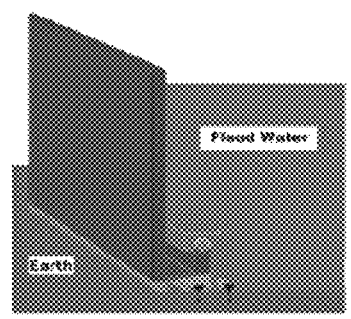
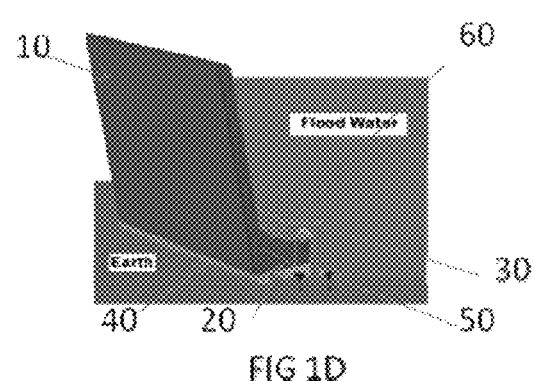
FIG 1A   FIG 1B   FIG 1C   FIG 1D

FLOOD CONTROL

CROSS-REFERENCE TO RELATED APPLICATIONS

This application is a National Stage Application of International Application No. PCT/MY2013/000032, filed Feb. 22, 2013, which claims benefit of Malaysian Serial No. PI 2012000852, filed Feb. 24, 2012 in Malaysia; and which applications are incorporated herein by reference in their entireties. To the extent appropriate, a claim of priority is made to each of the above disclosed applications.

FIELD OF THE INVENTION

The present invention generally relates to flood control. More particularly, the present invention relates to panels, assemblies, devices and barriers configured for flood control.

BACKGROUND OF THE INVENTION

Over the years, flood has caused major damages to structures, building and human life. The locations subject to flooding from over-flowing rivers and/or heavy rain accumulations include factory buildings and other structures in low-lying areas. In many such cases, the level of the flood waters may not be especially high, yet the damage caused can be very extensive. For. eg, in a factory building, a flood water inundation of even a few inches may cause massive damage to valuable machinery, electric motors, electronic controls, etc.

Even though, prior art structures such as sand bags are useful for temporarily providing flood protection, such methods and arrangements have proven to be unsatisfactory. Furthermore, they are time consuming especially when considering that the time available to provide at least temporary flood protection in flood-prone areas many range from hours to several days. Also, such prior art structures can rapidly become saturated and structurally weakened to the point of failure. Furthermore, they create a problem with respect to removal after the flood waters have subsided.

In view of the above reasons, it is therefore required to provide structures, assemblies, devices that overcome the problems associated with the prior arts.

SUMMARY OF THE INVENTION

Accordingly, the present invention provides a flood control assembly, the assembly comprising a panel having a base devised to lock with a rail, the rail adapted to a base of the panel; a tube at the base of the panel; and means for fastening the rail to a surface; wherein the panel rests on the tube when the panel bends under a force of flowing water, the bending is counter balanced by water force exerted on the rail, the balance of forces enabling the assembly to remain in position.

According to an embodiment, the present invention provides a flood control device comprising a pair of panels connected on sides of a frame to form an enclosed cabinet; at least one opening on a top plate of the frame; at least one opening each on the panels; an inflating lug on a first side plate of the frame, the side plate being adjacent to the top plate of the frame; and a coupling slot on a second side plate of the frame, the second side plate being opposite to the first side plate.

According to an embodiment the present invention provides a flood control barrier comprising a plurality of flood control devices coupled in series to form a channel, the devices are coupled when a coupling slot of a first device engages with an inflating lug of a second device; a supporting rail configured to retain the channel of control devices; and a pair of opposite bars having means for accommodating a plurality of channels.

DETAILED DESCRIPTION OF THE DRAWINGS

The foregoing summary, as well as the following detailed description, is better understood when read in conjunction with the appended drawings. For the purpose of illustrating a flood control assembly, a flood control device and a flood control barrier, there is shown in the drawings exemplary constructions thereof; however, the flood control assembly, device and barrier are not limited to the specific methods and instrumentalities disclosed. In the drawings:

FIG. 1A-1D shows a flood control assembly in accordance with an embodiment of the present invention.

DESCRIPTION OF THE INVENTION

Figure 2A:
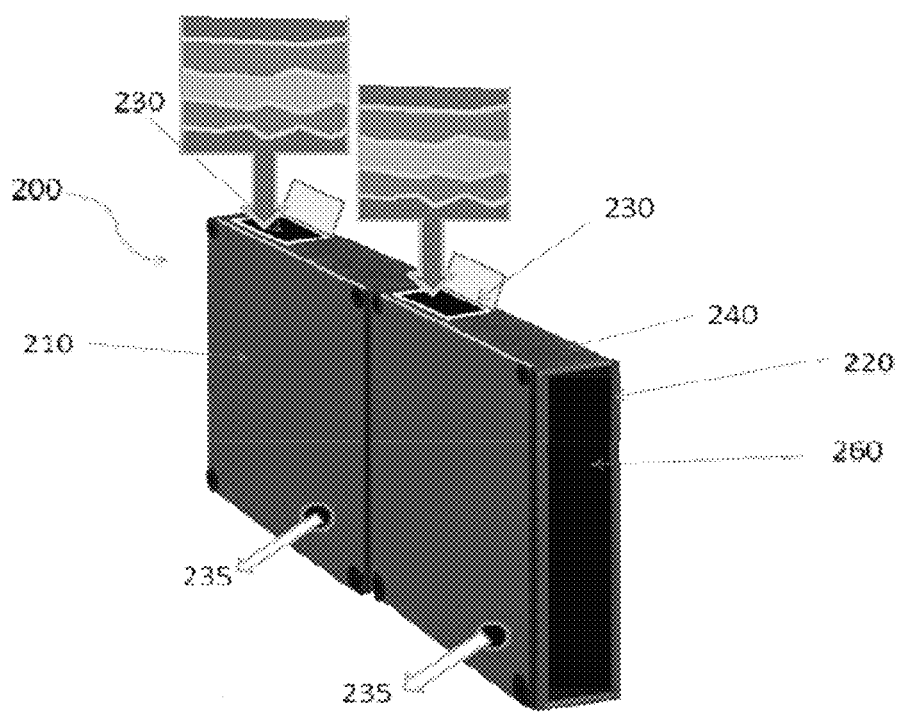
FIG. 2A-2B shows a flood control device in accordance with an embodiment of the present invention.

Various embodiments of the present invention describe a panel, an assembly, a device and barrier for flood control.

According to an embodiment, the present invention provides a collapsible panel, the panel comprising a planar member wherein a pair of planar members adapted to a frame having lug and coupling means made of soft material, the pair of planer members filled with an object in between the planar members enables inflating.

According to an embodiment the present invention provides a flood control assembly, the assembly comprising a panel having a base devised to lock with a rail, the rail adapted to a base of the panel; a tube at the base of the panel; and means for fastening the rail to a surface; wherein the panel rests on the tube when the panel bends under a force of flowing water, the bending is counter balanced by water force exerted on the rail, the balance of forces enabling the assembly to remain in position.

FIG. 1A-1D shows a flood control assembly 100 in accordance with an embodiment of the present invention. Flood control assembly 100 includes panel 10. The panel 10 has a base 20 and a rail 30 adapted to the base 20 as shown in FIG. 1B. The base 20 has a tube 40 at bottom 12 of the assembly 100. The base 20 has an inside tube 40a adapted to engage with rail 30 as shown in FIG. 1C. The rail 30 has holes accommodating fastening means 50 for fastening the assembly 100 to earth surface.

In an embodiment, the tube 40 and inside tube 40a of the flood control assembly 100 are rubber tubes preventing any leakage possibility of flood water.

The flood water rises and pushes panel 10, the panel 10 bends backwards against force of flood water as shown in FIG. 1D. As the panel 10 is forced against the bending as well as strong weight of water from top, bottom attachment of assembly 100 is pressed downwards. The tube 40 attached to the base 20 is pressed against the earth surface. The press of tube 40 acts as a plug to stop water from flowing through or leaking.

Further, as the panel 10 starts to bend under the weight of water, the base 20 of the panel 10 correspondingly pushes upwards with the rubber solid tube 40 pressing against a "C Channel" 60 which has exact fit of size of the rubber solid inside tube 40*a*. The tube 40*a* is exactly a mould fit.

The panel 10 rests on the tube 40 when the panel 10 bends under a force of flowing water, the bending is counter balanced by water force exerted on the rail 30 and inside tube 40*a*, the balance of forces enabling the assembly to remain in position.

In an embodiment, the rail 30 is fastened to earth surface thereby strictly positioning the assembly 100 on the earth surface. In an embodiment, the means 50 to fasten rail 30 to the earth surface are screws.

In an embodiment, material for the panel 10, rail 30 and means 40 of the control assembly 100 is selected from a group of metal, perforated metal, expanded metal, thermoplastic or the like.

According to an embodiment, the present invention provides a flood control device comprising a pair of panels connected on sides of a frame to form an enclosed cabinet; at least one opening on a top plate of the frame; at least one opening each on the panels; an inflating lug on a first side plate of the frame, the side plate being adjacent to the top plate of the frame; and a coupling slot on a second side plate of the frame, the second side plate being opposite to the first side plate.

Figure 2B:
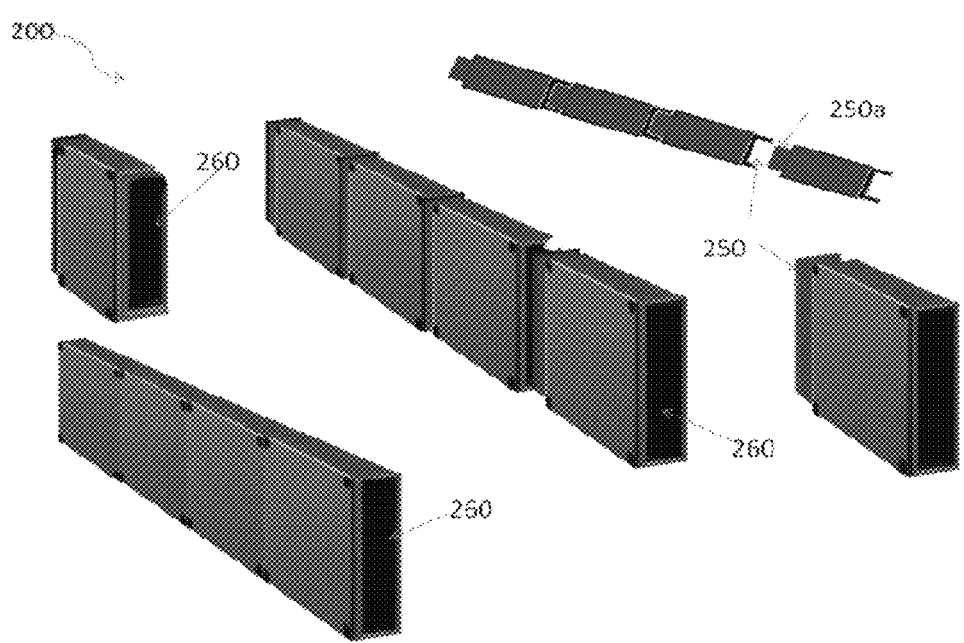

FIGS. 2A and 2B shows a flood control device 200 in accordance with an embodiment of the present invention. The flood control device 200 includes a pair of panels 210 connected on sides of a frame 220 to form an enclosed cabinet. Flood control device 200 has at least one opening 230 on a top plate 240 of the frame 220; at least one opening 235 each on the panels 210; an inflating lug 250*a* on a first side plate 250 of the frame 220, the side plate 250 being adjacent to the top plate 240 of the frame 220; and a coupling slot 260*a* on a second side plate 260 of the frame 220, the second side plate 260 being opposite to the first side plate 250.

In an embodiment, the flood control device is inflated for withstanding force of water allowing the device to remain in position.

In an embodiment referring to FIG. 1 A and FIG. 2A a collapsible panel (10, 210) is provided in accordance with an embodiment of the present invention, the panel (10, 210) comprises a planar member 12 wherein a pair of planar members 12 adapted to a frame 220 having lug and coupling means made of soft material, the pair of planer members 12, 12*b* filled with an object in between the planar members 12 enables inflating. The object may be sand or water.

As shown in FIG. 2A, sand mixed with water is poured into opening 230 located on top of device 200. At the same time, an opening 235 at bottom of panel 210 is opened slightly to allow water to be drained out leaving only sand inside the device 200.

In an exemplary embodiment, once the device 200 is filled fully with sand, the device 200 becomes very solid and heavy therefore the device can overcome the flood waters.

In an optional aspect, the device 200 can be filled with just water or air alone. The capabilities of the device 200 are more or the same. In an embodiment after operations to use flood control device 200 is over, a cap situated near to the bottom of the device 200 is opened, water is poured from top and then the water washes the sand and allows the sand to come out from the cap opening.

In an embodiment, the frame 220 of the flood control device 200 is constructed of rigid plates. In an embodiment, the frame 220 is rectangular. As per one embodiment, the flood control device 200 is inflated with water.

As per another embodiment, the flood control device 220 is inflated with sand. In an embodiment, the panels 210 material is selected from a group of metal, perforated metal, expanded metal, thermoplastic or the like. In an embodiment, the frame 220 material is selected from a group of metal, perforated metal, expanded metal or the like.

According to an embodiment the present invention provides a flood control barrier comprising a plurality of flood control devices coupled in series to form a channel, the devices are coupled when a coupling slot of a first device engages with an inflating lug of a second device; at least one supporting rail configured to retain the channel of control devices; a plurality of fastening means for fixing the barrier to ground; and a pair of opposite bars having means for accommodating a plurality of channels.

Figure 3A:
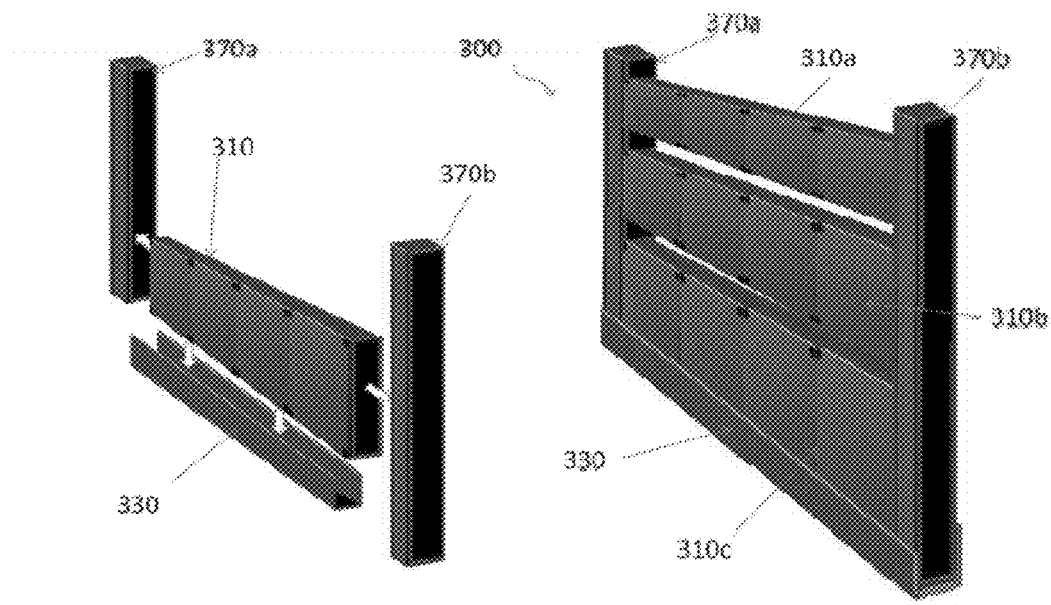
FIG. 3A-3E shows a flood control barrier in accordance with an embodiment of the invention.

FIG. 3A shows a flood control barrier 300 in accordance with an embodiment of the present invention. Referring to FIG. 3A-3E, the barrier 300 includes a plurality of flood control devices 380 coupled in series to form a channel 310, the devices 380 are coupled when an inflating lug 350*a* of a first device 350 engages with a coupling slot 360*a* of a second device 360; a supporting rail 330 configured to retain the channel 310 of control devices 380; and a pair of opposite bars 370 (370*a*, 370*b*) having means for accommodating a plurality of channels 310 (310*a*, 310*b*, 310*c*), the bars are retained along with the channels in supporting rail 330 as shown in FIG. 3A.

Figure 3B:
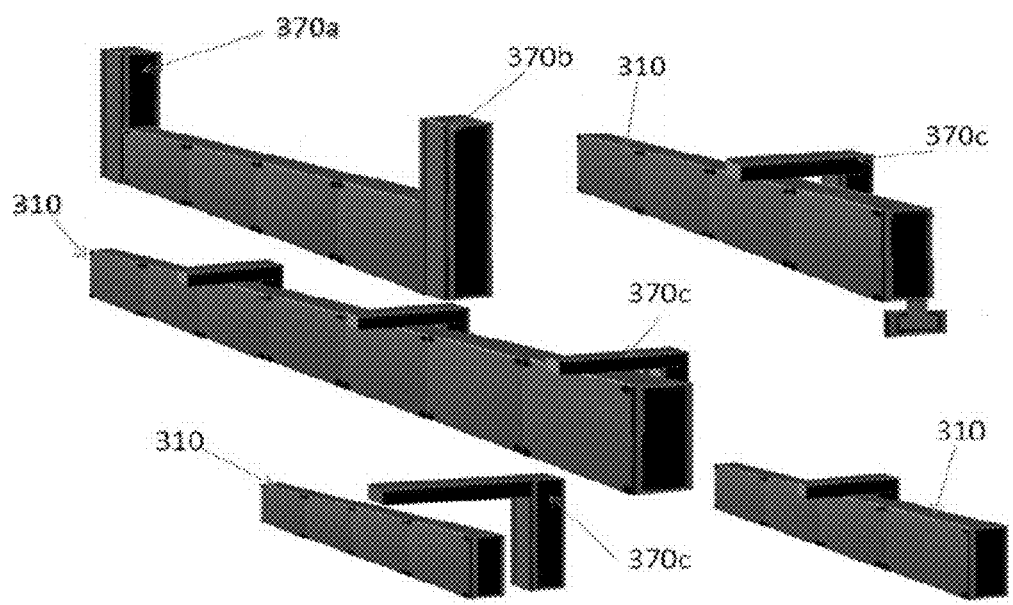
Figure 3C:
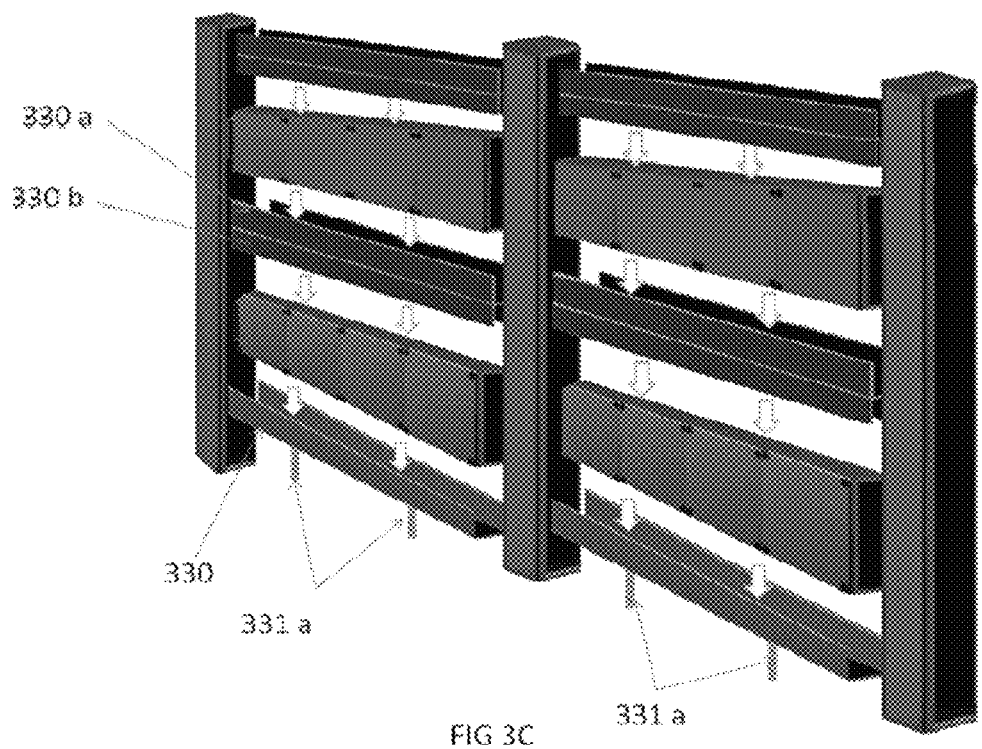

FIG. 3C shows the supporting rails 330 (330*a*, 330*b*) connected to each other by welding to form a chassis for retaining channel 310. The barrier is fixed to ground by plurality of fastening means 331*a*. The fastening means 331*a* are expandable nuts and bolts 331*a* utilized for fixing the barrier 300 to ground.

Figure 3D:
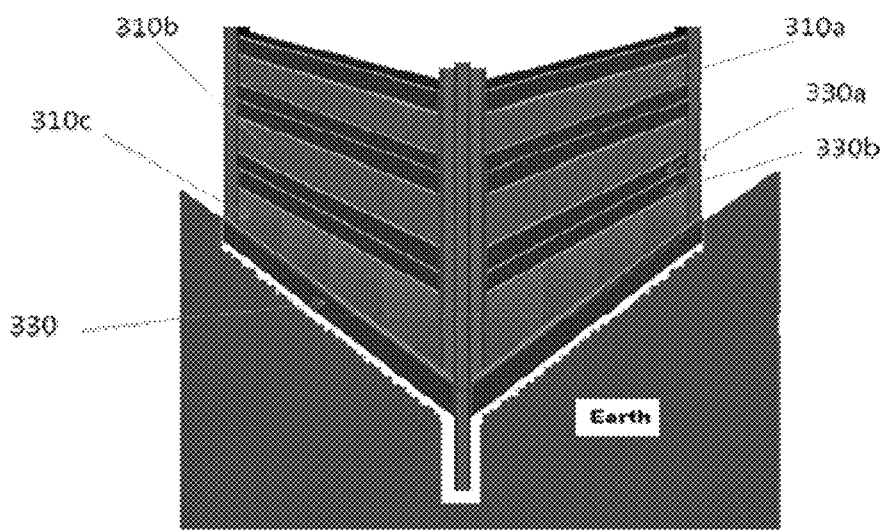

FIG. 3D shows the barrier 300 fixed to ground in accordance to an embodiment of the present invention. The barrier 300 can be utilized even at corners and any curves or bending directions as shown in FIG. 3D.

Figure 3E:
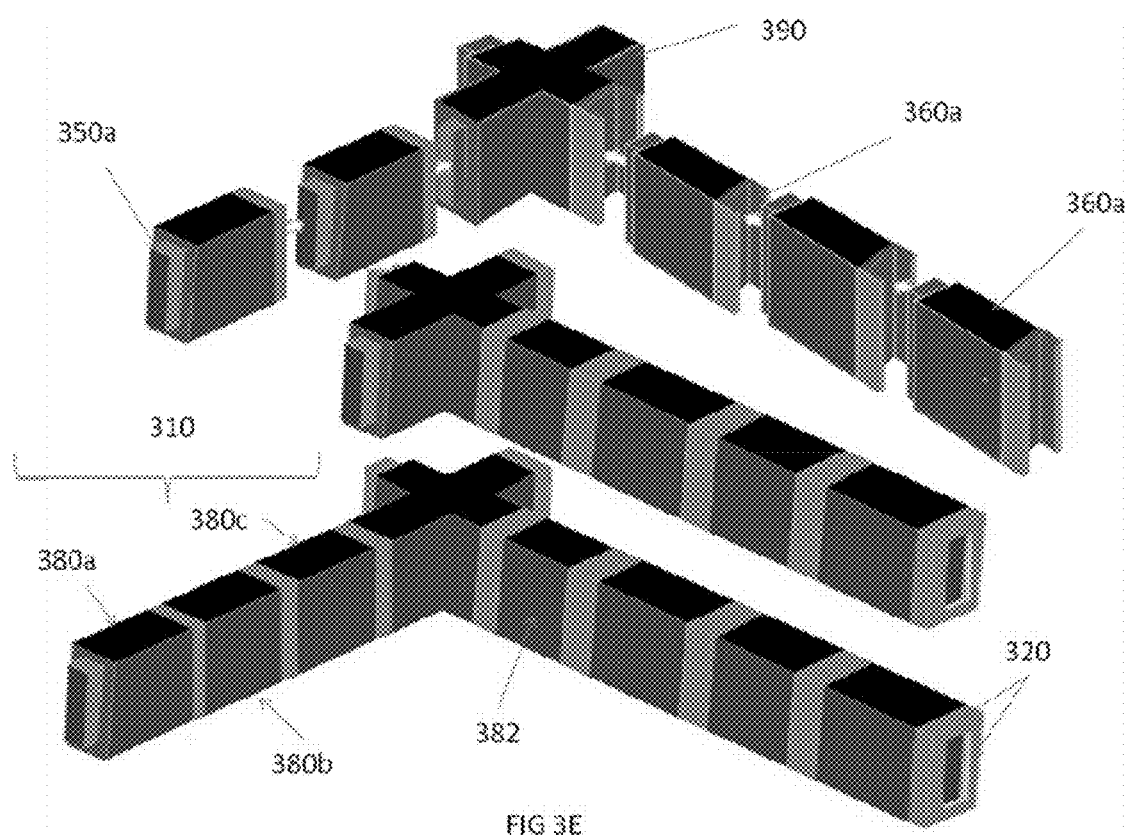

FIG. 3E shows the channel 310 formed by coupling a plurality of flood control devices 380 (380*a*, 380*b*) in accordance with an embodiment of the present invention. The coupling slot 360*a* engages with inflate lug 350*a* to form the channel 310.

In an embodiment, the channel 310 is engaged with bar 370*c* in a configuration as shown in FIG. 3B. According to an embodiment, as shown in FIG. 3E, each of the plurality of control devices 380 (380*a*, 380*b*, 380*c*) include a pair of panels 382 connected on sides of a frame 320 to form an enclosed cabinet; an inflating lug 340 on a first side plate of the frame 320, the side plate being adjacent to a top plate of the frame 320; and a coupling slot 360*a* configured to accommodate the inflating lug 340 for locking the control devices 380 to form channel 310.

In an embodiment, the control devices 380 are coupled to form cross channel 390. In an embodiment, the flood control devices 380 (380*a*, 380*b*, 380*c*) and the bars 370 (370*a*, 370*b*, 370*c*) are inflated for strengthening the barrier to remain positioned on a surface. As per one embodiment, the flood control devices 380 are inflated by pumping air.

As per another embodiment, the bars 370 of the barrier are inflated with air. According to an embodiment, the control devices 380 presses against each other when connected and are inflated with air. The connecting is strengthened by the inflated air. Further, bars 370 presses against the channel 310 when connected and are inflated with air. In an embodiment, the barrier 300 is positioned on earth surface.

As per exemplary one embodiment, the plurality of channels 310 (310*a*, 310*b*, 310*c*) is accommodated in a configuration of one over the other enabling formation of the barrier 300 as shown in FIG. 3A. In an embodiment, the control device material is selected from a group of metal, perforated metal, expanded metal, thermoplastic or the like.

According to an exemplary embodiment, the flood control assembly 100, device 200 and barrier 300 are portable. The device 200 and barrier 300 are inflatable for positioning themselves firmly with respect to the ground.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. A flood control barrier comprising:
    a plurality of flood control devices coupled in series to form a channel, the devices are coupled when a coupling slot of a first device engages with an inflating lug of a second device, wherein each flood control device comprises:
        a pair of panels connected on sides of a frame to form an enclosed cabinet, wherein the pair of panels are collapsible panels;
        at least one opening on atop plate of the frame;
        at least one opening each on the panels at a bottom;
        an inflating lug on a first side plate of the frame, the side plate being adjacent to the top plate of the frame; and
        a coupling slot on a second side plate of the frame, the second side plate being opposite to the first side plate;
        wherein the at least one opening on the top plate and the at least one opening each on the panels at the bottom enables flow and retention of inflating material in the enclosed cabinet for withstanding force of water thereby allowing the device to remain in position, wherein sand mixed with water is poured into the opening on the top plate and at the same time the opening at bottom of the panels is opened slightly to allow water to be drained out leaving only sand inside the device, and wherein the device becomes very solid and heavy;
    at least one supporting rail configured to retain the channel of control devices;
    a pair of opposite bars having means for accommodating a plurality of channels; and
    a plurality of fastening means for fixing the barrier to ground, wherein the fastening means are expandable nuts and bolts;
    wherein a counter balance of force exerted on the control device and the rail by a flood enables the barrier to remain in position.

2. The flood control barrier as claimed in claim 1, wherein the flood control devices and the bars are inflated for strengthening the barrier to remain positioned on a surface.

3. The flood control barrier as claimed in claim 2, wherein the flood control devices are inflated by pumping air.

4. The flood control barrier as claimed in claim 2, wherein the bars are inflated with air.

5. The flood control barrier as claimed in claim 1, wherein the plurality of channels is accommodated in a configuration of one over the other enabling formation of the barrier.

6. The flood control barrier as claimed in claim 1, wherein the control device is formed of a material selected from the group consisting of perforated metal, expanded metal, and thermoplastic.

* * * * *